Patented Jan. 10, 1939

2,143,590

UNITED STATES PATENT OFFICE 2,143,590

INSULIN PREPARATION AND PROCESS OF PRODUCING CRYSTALS OF INSULIN

David Alymer Scott, Forest Hill, Ontario, Canada, assignor to The Governors of the University of Toronto, Toronto, Ontario, Canada No Drawing. Application September 26, 1936, Serial No. 102,795

10 Claims. (Cl. 167—75)

My invention relates to preparations of 'Insulin', from which preparations crystals of 'Insulin' may be obtained with certainty and good yields; and to the process of producing such crystals.

Crystals of 'Insulin' have previously been obtained, first by Abel and subsequently by others. However, it proved possible for them to obtain in crystalline form only a small percentage of the 'Insulin' present in their preparations; and their methods for obtaining crystals were in large measure empirical, and uncertain of success.

I have discovered how to produce crystals of 'Insulin' from non-crystalline 'Insulin' with certainty, and with high yields. I have found that in order to produce crystals of 'Insulin' with certainty and high yields, it is necessary that there be present a metal of the class consisting of zinc, nickel, cobalt, and cadmium, in ample amount.

My invention, therefore, consists fundamentally in ensuring the presence of any one of these metals in ample amount in an 'Insulin' solution or suspension, from which 'Insulin' may be crystallized.

The crystals of 'Insulin' which I have obtained have contained such metal in about the following proportions, taken as the mean of a number of determinations:

'Insulin' crystals obtained with zinc—0.52% zinc.
'Insulin' crystals obtained with cadmium—0.77% cadmium.
'Insulin' crystals obtained with cobalt—0.44% cobalt.
'Insulin' crystals obtained with nickel—0.41% nickel.

If the molecular weight of 'Insulin' be taken as about 40,000, which is in the range commonly accepted therefor, the figures just given would be consistent with the presence with the 'Insulin' of three atoms of any of the metals named. However, while I think the indications are that there is some kind of combination between the 'Insulin' and the metal in the formation of the crystals, I here advance no theory in this respect.

In carrying out my invention, I form any desired solution or suspension of 'Insulin'. Desirably a solution is made considerably on the acid side of the isoelectric point of 'Insulin'; as by having present in the 'Insulin' solution one or more buffering agents, such for instance as acetates or phosphates of sodium or potassium or ammonium, and such an amount of acid, for example hydrochloric or acetic acid, as may be required to obtain a hydrogen ion concentration at about pH 2 to pH 4. It is possible, however, to make a solution or suspension at, or on the alkaline side of, the said isoelectric point if desired. Also, in order to obtain good yields, it is often desirable, as when a sodium or potassium buffer is used, to add a small amount of a substance which reduces the surface tension of the solution or suspension, such for instance as acetone or saponin or propyl or butyl or amyl alcohol; but this is not desirable with some other buffers.

Then, unless a sufficient amount of the desired metal or metals, of the class consisting of zinc, cobalt, nickel, and cadmium, is already present, I add enough thereof, most desirably zinc, to make the total concentration of said metals in the solution or suspension, in proportion to the dry weight of 'Insulin' present, at least of the order of metal concentration in crystals of 'Insulin', and desirably three to five times as great as that. That means, in other words, that if only one of said metals is present, its concentration in the solution or suspension is made such that the number of grams of metal per 100 grams dry weight of 'Insulin' present is at least the atomic weight of the metal multiplied by about 0.007 to 0.008, and is desirably three to five times that. A convenient approximation for the least metal concentrations referred to above is about 0.5% of the dry weight of the 'Insulin'. If more than one of said metals are present, their individual concentrations may, of course, be proportionately less.

The metal may be added in the form of any suitable salt, such as the chloride or the acetate; or may be added in metallic form. It is even possible to do that adding, and to get a sufficient amount of the metal present, by conducting the procedure in vessels made of or containing the desired metal, or by passing the preparation through pipes made of or containing such metal.

As well as making certain that the necessary amount of zinc, cobalt, nickel, or cadmium is present, I also make certain that the final hydrogen ion concentration of the preparation of 'Insulin' falls within the range in which crystals of 'Insulin' form. The best range is ordinarily between about pH 5.8 to pH 6.5. A final hydrogen ion concentration within the desired range may be obtained in any suitable way, as by proper selection of reagents in respect of their acidic and basic characteristics or by addition of a suitable acid or base such as hydrochloric or acetic acid or sodium or ammonium hydroxide, at any desired stage of the process. When the desired final hydrogen ion concentration has been obtained, the preparation is left standing for several hours, during which time crystals of 'Insulin' form. The crystals so formed may be removed, as by filtering or decanting or centrifuging, and then washed with water, dried, and preserved.

An example of this general procedure is as follows:

A phosphate buffer solution is prepared containing 335 g. of $Na_2HPO_4.12H_2O$ and 55 g. of $KH_2PO_4$ in 20 litres of distilled water. The hydrogen ion concentration is at about pH 7.2. 2500 cc. of this solution are measured into a glass container; and to it is added an equal volume of distilled water together with 200 cc. of normal HCl, so that the hydrogen ion concentration is at approximately pH 2.3. Then 200 cc. of an 'Insulin' solution containing 30 mg. of 'Insulin' (15 to 20 units per mg.) per cc. are added, followed by 50 cc. of a 0.5% aqueous solution of $ZnCl_2$ and 500 cc. of acetone. The acidity of the solution is then adjusted to about pH 6.2 by the addition of 150 cc. of normal $NH_4OH$. The preparation is allowed to stand at room temperature for 4 to 6 hours, and then placed in a refrigerator for about two days. Then the crystals which have formed are separated from the supernatant liquid by decanting and centrifuging, washed with water, and dried in vacuo. Using this procedure, yields as large as about 90% of the original 'Insulin' have been obtained in the form of crystals.

If desired, recrystallization may be effected. Advantageously an acetate buffer is used, say ammonium acetate, in order to minimize formation of undesired insoluble metal salts. The preparation of crystals that is to be subjected to recrystallization is dissolved in enough $$\frac{N}{3}$$

acetic acid so that each litre of solution contains 2.0 g. of such crystals. To each 500 cc. of this solution an approximately equal volume of $$\frac{N}{3} NH_4OH$$

is added, so that the acidity of the resulting mixture is about pH 6.1. This mixture is allowed to stand at room temperature for 4 to 6 hours, and then in a refrigerator for about two days; and the crystals which have formed are separated, washed with water, and dried in vacuo, as before.

The crystals of 'Insulin' obtained by my process are substantially free from foreign proteins, and other contaminants. Such impurities may be present in some commercial preparations of 'Insulin', and in some instances cause undesirable effects in the patient, as by reason of some sensitivity of the patient to these impurities. Thus by the administration of crystals of 'Insulin', in solution or otherwise, it is possible to avoid in large measure and often entirely any untoward effects in such sensitive patients.

For injection, solutions or suspensions of the crystals of 'Insulin' may be formed in any convenient liquid, such as simple water, with or without having other substances co-present. The hydrogen ion concentration of solution is desirably kept on the acid side of the isoelectric point of 'Insulin'; as at pH 2 to pH 4.

I claim as my invention:

1. The process steps which consist in producing crystals of 'Insulin' from an 'Insulin' solution or suspension made with non-crystalline 'Insulin' and containing 'Insulin' and at least one metal of the class consisting of zinc, cobalt, nickel, and cadmium, with the metal present in sufficient amount in proportion to the 'Insulin' to produce with certainty a high yield of crystals of 'Insulin', and adjusting the preparation to between pH 5.8 and 6.5 to promote the formation of crystals of 'Insulin'.

2. In the process of producing crystals of 'Insulin', the steps of forming a solution of 'Insulin', and adding thereto a sufficient amount of a metal of the class consisting of zinc, cobalt, nickel, and cadmium to obtain a concentration of such metal in which the number of grams of the metal per 100 grams dry weight of 'Insulin' present is at least the atomic weight of the metal multiplied by 0.007.

3. In the process of producing crystals of 'Insulin', the steps of forming a solution of 'Insulin', adding thereto a sufficient amount of a metal of the class consisting of zinc, cobalt, nickel, and cadmium to obtain a concentration of such metal in which the number of grams of metal per 100 grams dry weight of 'Insulin' present is at least the atomic weight of the metal multiplied by 0.007, and adjusting the solution to about pH 5.8 to pH 6.5 to promote the formation of crystals of 'Insulin'.

4. In the process of producing crystals of 'Insulin', the step of forming with non-crystalline 'Insulin' a solution or suspension which contains both 'Insulin' and at least enough of a metal of the class consisting of zinc, cobalt, nickel, and cadmium to equal 0.5% of the dry weight of the 'Insulin'.

5. In the process of producing crystals of 'Insulin', the steps of forming with non-crystalline 'Insulin' a solution or suspension which contains both 'Insulin' and at least enough of a metal of the class consisting of zinc, cobalt, nickel, and cadmium to equal 0.5% of the dry weight of the 'Insulin', and adjusting the solution to about pH 5.8 to pH 6.5 to promote the formation of crystals of 'Insulin'.

6. In the process of producing crystals of 'Insulin', the step of forming with non-crystalline 'Insulin' a buffered solution or suspension which is at a hydrogen ion concentration on the acid side of the isoelectric point of 'Insulin' and which contains both 'Insulin' and at least enough of a metal of the class consisting of zinc, cobalt, nickel, and cadmium to equal at least 0.5% of the dry weight of the 'Insulin'.

7. In the process of producing crystals of 'Insulin', the steps of forming with non-crystalline 'Insulin' a buffered solution or suspension which is at a hydrogen ion concentration on the acid side of the isoelectric point of 'Insulin' and which contains both 'Insulin' and at least enough of a metal of the class consisting of zinc, cobalt, nickel, and cadmium to equal at least 0.5% of the dry weight of the 'Insulin', and adjusting the solution to about pH 5.8 to pH 6.5 to promote the formation of crystals of 'Insulin'.

8. In the process of producing crystals of 'Insulin', the step of forming with non-crystalline 'Insulin' a buffered solution or suspension which is at a hydrogen ion concentration on the alkaline side of the isoelectric point of 'Insulin' and which contains both 'Insulin' and at least enough of a metal of the class consisting of zinc, cobalt, nickel, and cadmium to equal at least 0.5% of the dry weight of the 'Insulin'.

9. In the process of producing crystals of 'Insulin', the step of forming with non-crystalline 'Insulin' a buffered solution or suspension which is at a hydrogen ion concentration on the alkaline side of the isoelectric point of 'Insulin' and which contains both 'Insulin' and at least enough of a metal of the class consisting of zinc, cobalt, nickel, and cadmium to equal at least 0.5% of the dry weight of the 'Insulin', and adjusting the solution to about pH 5.8 to pH 6.5 to promote the formation of crystals of 'Insulin'.

10. In the process of producing crystals of 'Insulin', the steps of forming a solution of 'Insulin', and adding thereto a sufficient amount of a metal of the class consisting of zinc, cobalt, nickel, and cadmium to produce crystals of 'Insulin' with certainty.

DAVID ALYMER SCOTT.